(12) United States Patent
Ishibashi

(10) Patent No.: US 6,279,830 B1
(45) Date of Patent: Aug. 28, 2001

(54) TWO-DIMENSIONAL CODE, READING AND PRODUCING METHOD AND RECORDING MEDIUM STORING RELATED SOFTWARE

(75) Inventor: Toshiharu Ishibashi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/383,991

(22) Filed: Aug. 26, 1999

(30) Foreign Application Priority Data

Sep. 3, 1998 (JP) .................................................. 10-249796
May 11, 1999 (JP) .................................................. 11-129979

(51) Int. Cl.[7] .................................................. G06K 19/06
(52) U.S. Cl. .................. 235/494; 235/454; 235/487; 235/462.09; 235/462.1; 235/462.25; 235/456; 235/460
(58) Field of Search .................................. 235/494, 487, 235/462.01, 454, 456, 462.09, 462.1, 462.25, 460

(56) References Cited

U.S. PATENT DOCUMENTS

| | | | |
|---|---|---|---|
| 4,874,936 | * 10/1989 | Chandler et al. | 235/494 |
| 5,591,956 | * 1/1997 | Longacre, Jr. et al. | 235/494 |
| 5,686,718 | * 11/1997 | Iwai et al. | 235/494 |
| 5,726,435 | 3/1998 | Hara et al. | 235/294 |
| 5,773,806 | * 6/1998 | Longacre, Jr. | 235/462 |
| 5,825,947 | * 10/1998 | Sasaki et al. | 235/494 |
| 5,874,718 | * 2/1999 | Matsui | 235/494 |
| 5,936,228 | * 8/1999 | Yoshihara | 235/494 |
| 6,000,614 | * 12/1999 | Yang et al. | 235/460 |
| 6,000,621 | * 12/1999 | Hecht et al. | 235/494 |
| 6,116,510 | * 9/2000 | Nishino | 235/494 |
| 6,135,353 | * 10/2000 | Konosu et al. | 235/462.09 |
| 6,175,827 | * 1/2001 | Cordery et al. | 705/410 |

FOREIGN PATENT DOCUMENTS 7-254037  10/1995  (JP) .

* cited by examiner

Primary Examiner—Michael G. Lee
Assistant Examiner—Uyen-Chau N. Le
(74) Attorney, Agent, or Firm—Pillsbury Winthrop LLP

(57) ABSTRACT

A two-dimensional code includes a plurality of cells arranged in a predetermined two-dimensional pattern. The code comprises an information recording region constituted by a plurality of blocks. Each block involves a recording mode designating code indicating a recording mode of the information recorded in each block. Partial decode processing is performed for decoding the recorded information in each block in accordance with the recording mode specified by the recording mode designating code. And, the information in the information recording region is read based on the partial decoding result of the plurality of blocks.

39 Claims, 15 Drawing Sheets

54A, 54B, 54C

[D1~D23 : DATA BLOCK 1    D24~D46 : DATA BLOCK 2]
[E1~E44 : RS BLOCK 1    E45~E88 : RS BLOCK 2]

COMPARATIVE EXAMPLE

COMPARATIVE EXAMPLE

[D1~D23 : DATA BLOCK 1    D24~D46 : DATA BLOCK 2]
[E1~E44 : RS BLOCK 1      E45~E88 : RS BLOCK 2]

TWO-DIMENSIONAL CODE, READING AND PRODUCING METHOD AND RECORDING MEDIUM STORING RELATED SOFTWARE

BACKGROUND OF THE INVENTION

The present invention relates to a two-dimensional code, a method for reading the two-dimensional code, a method for producing two-dimensional code, and a recording medium storing related software programs.

For example, Unexamined Japanese Patent Publication No. 7-254037 (U.S. Pat. No. 5,726,435) discloses a conventional two-dimensional code which is so-called QR code. As shown in FIG. 18B, information has a two-dimensional spread. A great amount of information can be recorded compared with a bar code shown in FIG. 18A, although the code arrangement is complicated.

FIG. 19 is a view showing a schematic arrangement of such a conventional two-dimensional code. To enable the positional identification of the two-dimensional code, a two-dimensional code 500 comprises a plurality of positioning symbols 510a, 510b, and 510c as well as timing cells 520a and 520b. The inside space of two-dimensional code 500 is dissected into a matrix of n×n cells. Three positioning symbols 510a, 510b and 510c are located at three different corners of two-dimensional code 500. Each of the positioning symbols 510a, 510b and 510c has a same bright-and-dark pattern. The bright-and-dark pattern consists of three optically discriminable regions; an outer black region 512 forming a rectangular frame-like zone with a one-cell width, an inner black region 516 forming a square zone of 3 cells×3 cells, and an intermediate while region 514 interposed between two black regions 512 and 516 so as to form a rectangular frame-like zone with a one-cell width.

When a scanning line crosses the center of each positioning symbol, a same bright-and-dark pattern ,i.e., 1(black):1 (white):3(black):1(white):1(black), is always obtained regardless of the scanning angle. Thus, in the detection of two-dimensional code 500, the above bright-dark pattern is first searched to identify the location of all positioning symbols 510a, 510b and 510c.

The two-dimensional code 500 has an information recording region 530 consisting of data cells for recording data. The cell position (i.e., coordinate values) of each data cell can be calculated based on each central position of the positioning symbols 510a, 510b and 510c and timing cells 520a and 520b. In a decoding operation, information (i.e., black or white) recorded in each data cell is converted into binary data (i.e., 1 or 0).

According to such a two-dimensional code, it is desirable to provide the error-correcting function to safely decode the recorded data even if part of the code is unreadable due to damage, stain or the like.

SUMMARY OF THE INVENTION

An object of the present invention is to provide a two-dimensional code robust against damage or stain and capable of decoding the recorded data as much as possible in case of such defects.

Another object of the present invention is to provide a method for reading such a novel two-dimensional code.

Another object of the present invention is to provide a method for producing such a novel two-dimensional code.

Furthermore, another object of the present invention is to provide a recording medium storing related software programs.

In order to accomplish this and other related objects, one aspect of the present invention provides a two-dimensional code including a plurality of cells arranged in a predetermined two-dimensional pattern, the code comprising an information recording region for recording information, a plurality of blocks constituting the information recording region, and a recording mode designating code involved in each block for indicating a recording mode of the information recorded in each block.

Preferably, at least one of the plurality of blocks records error-correcting information applied to information recorded in other block.

For example, there are a plurality of block pairs, each block pair consisting of a data block and an error-correcting block. An error-correcting level is independently applied to each block pair. And, an error-correcting code is involved in each of the data block and the error-correcting block of the block pair. The error-correcting code indicates the error-correcting level of the block pair.

Preferably, the recording mode designating code of each block is disposed in front of the information recorded in the block, so that the recording mode designating code is decoded prior to the information in each block and the information is decoded according to the recording mode specified by the recording mode designating code.

Preferably, an area code is involved in each block of the two-dimensional code for directly or indirectly indicating an existing area of each block in the two-dimensional code.

For example, the area code is disposed at the head of each block so that the area code is decoded prior to the information recorded in each block. The recording mode designating code and the area code are represented by a cell distribution pattern. The cell distribution pattern is decodable into a bit string which is not used for recording the information in the information recording region. And, the recording mode designating code and the area code are specified by decoding the bit string. The recording mode designating code and the area code are located adjacent to each other so that the recording mode designating code and the area code are successively decoded.

Preferably, a format code region represented by a cell pattern is provided to specify an existing area of each block.

Preferably, there are a plurality of positioning symbols located at predetermined positions on the two-dimensional code to identify the position of the two-dimensional code.

Preferably, at least one of the plurality of blocks contains specific information requiring a specialized reading apparatus in a decoding operation. In this case, the specific information is recorded by using magnetic ink or special ink modifying a specific waveform so that the specific information is not optically recognized. The specific information may be enciphered so that a deciphering operation is additionally required in a code reading operation.

Another aspect of the present invention provides a method for reading the above-described two-dimensional code of the present invention. The reading method comprises the steps of performing partial decode processing for each of the plurality of blocks for decoding the recorded information in each block in accordance with the recording mode specified by the recording mode designating code, and reading the information in the information recording region based on the partial decoding result of the plurality of blocks.

Preferably, entire decode processing is performed to decode all of the information in the information recording region, and the partial decode processing is performed only when the entire decode processing is failed.

Preferably, the partial decode processing of the plurality of blocks is performed by determining a decoding order of the plurality of blocks.

Preferably, the information in the information recording region is read by performing an error-correcting operation based on decoding result of two related blocks.

Preferably, the partial decode processing is performed by decoding the information in a designated block based on the error-correcting level specified by the error-correcting code indicating the error-correcting level of the block pair consisting of a data block and an error-correcting block, when the error-correcting level is independently applied to each block pair.

Preferably, the recording mode designating code is decoded prior to the information in each block and the information is decoded according to the recording mode specified by the recording mode designating code. The recording mode designating code of each block is disposed in front of the information recorded in the block.

Preferably, the reading method comprises the steps of detecting the area code from a picture image of the two-dimensional code, identifying an existing area of a designated block based on the detected area code, and performing the partial decode processing of the designated block. The area code is involved in each block of the two-dimensional code for directly or indirectly indicating the existing area of each block in the two-dimensional code.

The partial decode processing is applied to a block including the area code and a succeeding data region, when the area code is disposed at the head of each block. The area code is decoded prior to the information recorded in each block. The recording mode designating code and the area code are represented by a cell distribution pattern. The cell distribution pattern is decodable into a bit string which is not used for recording the information in the information recording region. And, the recording mode designating code and the area code are specified by decoding the bit string. The recording mode designating code and the area code are located adjacent to each other so that the recording mode designating code and the area code are successively identified in a decoding operation.

Preferably, the recording method comprises the steps of detecting the format code region from a picture image of the two-dimensional code to obtain format of the two-dimensional code represented by the format code region, identifying the existing area of a designated block based on the detected format of the two-dimensional code, and performing the partial decode processing of the designated block. The format code region is represented by a cell pattern to specify an existing area of each block.

Preferably, the recording method comprises the steps of detecting the plurality of positioning symbols from a picture image of the two-dimensional code, identifying an existing area of a designated block based on the position of the plurality of positioning symbols, and performing the partial decode processing of the designated block. The plurality of positioning symbols are provided at predetermined positions on the two-dimensional code to identify the position of the two-dimensional code.

Another aspect of the present invention provides a method for producing the above-described two-dimensional code of the present invention. The producing method comprises the steps of encoding all of the information based on a predetermined error-correcting level designated as an initial value, additionally encoding the information of a block pair based on a designated error-correcting level when the designated error-correcting level of the block pair is different from the initial value, performing an overflow judgement for checking whether the coded information is accommodated in a corresponding block, repeating the encoding operation when the coded information overflows the corresponding block, by using another format having a wider information recording region until the encoded information fits the corresponding block.

Preferably, the produced two-dimensional code includes the error-correcting code in each of the data block and the error-correcting block of the block pair for indicating the error-correcting level of the block pair.

Another aspect of the present invention provides a recording medium storing a software program installable in a computer system for reading and/or producing the above-described two-dimensional code of the present invention.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
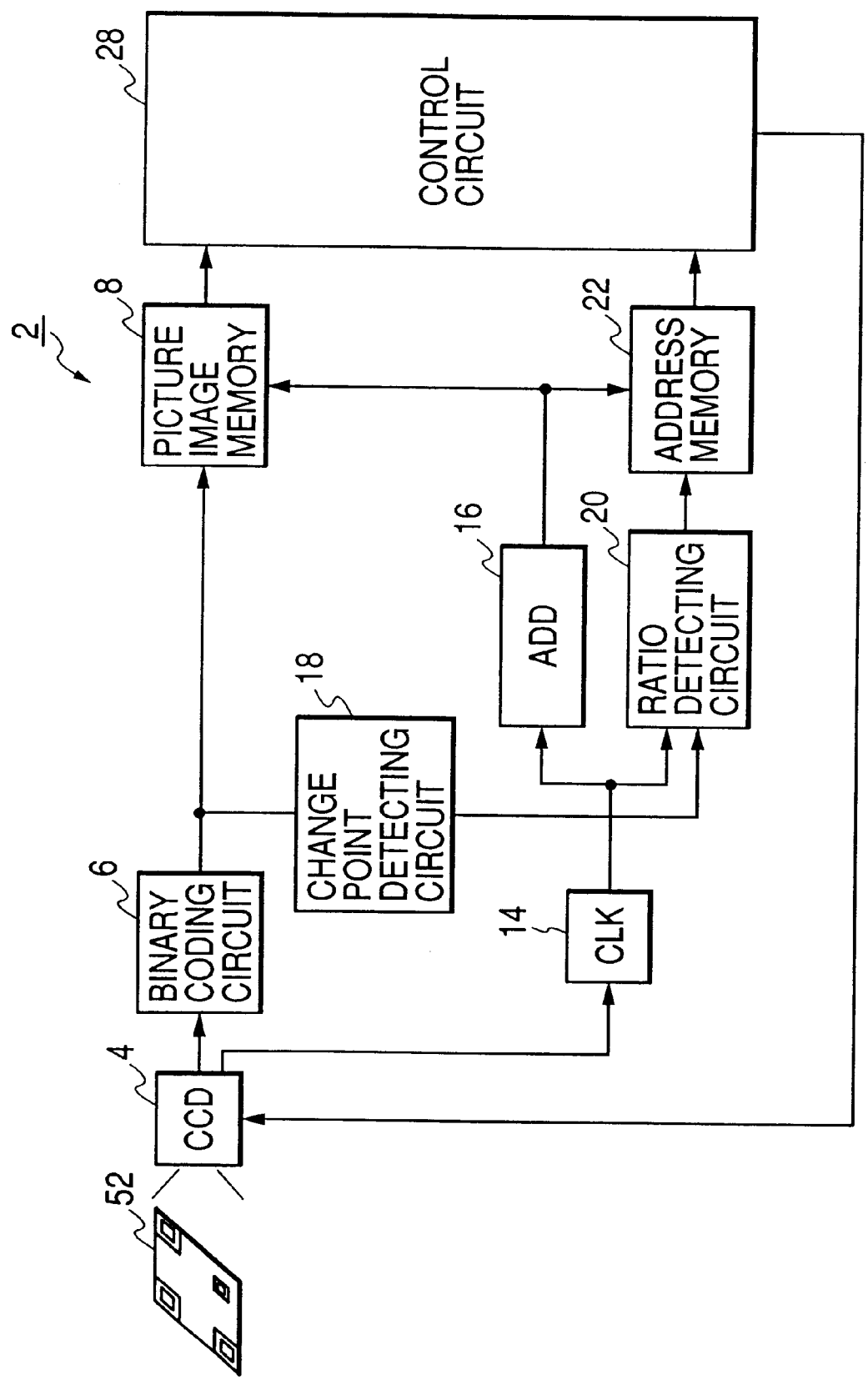
FIG. 1 is a schematic view showing a two-dimensional code reading apparatus in accordance with a preferable embodiment of the present invention.

Preferred embodiments of the present invention will be explained hereinafter with reference to attached drawings. Identical parts are denoted by the same reference numerals throughout the views.

Figure 2:
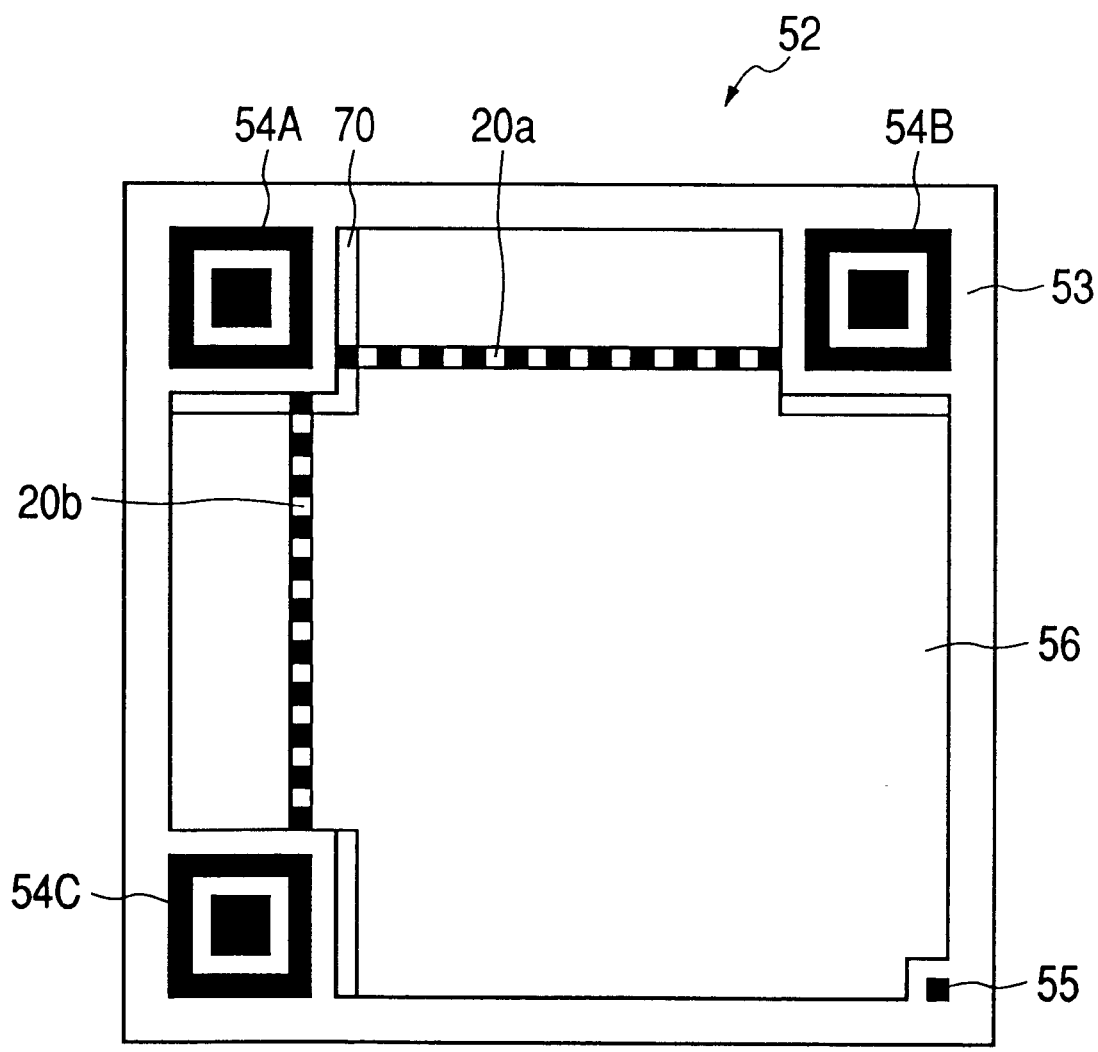
FIG. 2 is a schematic view showing one example of a two-dimensional code detectable by the two-dimensional code reading apparatus shown in FIG. 1.

FIG. 1 is a schematic view showing a two-dimensional code reading apparatus 2 in accordance with a preferable embodiment of the present invention. FIG. 2 is a schematic view showing one example of the two-dimensional code detectable by the two-dimensional code reading apparatus 2 shown in FIG. 1.

A two-dimensional code 52 shown in FIG. 2 is a so-called QR (quick response) code which is generally printed on a white sheet 53 and comprises three positioning symbols 54A, 54B and 54C, one apex detecting cell 55, an information recording region 56, timing cell regions 20a, 20b, and a format code region 70.

Each cell of in the information recording region 56 is selected from two optically different type cells. In the drawing and the following description, each cell is discriminable as a white (i.e., bright) cell or a black (i.e., dark) cell. Although not sown in FIG. 2, data cells in the information recording region 56 forms a white and black pattern.

Three positioning symbols 54A, 54B and 54C are located at three different corners of the rectangular (square) sheet of the two-dimensional code 52. Each of the positioning symbols 54A, 54B and 54C has a bright-and-dark pattern shown in FIG. 3A. The bright-and-dark pattern consists of three optically discriminable regions; an outer black region 55a forming a rectangular frame-like zone with a one-cell width, an inner black region 55c forming a square zone of 3 cells×3 cells, and an intermediate while region 55b interposed between two black regions 55a and 55c so as to form a rectangular frame-like zone with a one-cell width.

The apex detecting cell 55 is located at the remaining corner of the rectangular sheet of the two-dimensional code 52.

Each of timing cell regions 20a and 20b is a belt-like zone consisting of alternately arranged white and black cells extending between two of positioning symbols 54A, 54B and 54C. The timing cell regions 20a and 20b, disposed perpendicularly to each other, serve as reference pattern for identifying the position of each data cell.

The format code region 70, represented by a cell pattern, is located in the vicinity of the positioning symbol 54A, and indicates version information being set beforehand about the format of the information recorded in the information recording region 56. According to the regulation of the two-dimensional code (QR code) of this embodiment, the version information is expressed by the combination of a version and an error-correcting level, e.g., 3-L or 5-H. The version is selected from a total of eight (1–8) versions, while the error-correcting level for each version is selected from four error-correcting levels L, M, Q, and H.

Figure 5:
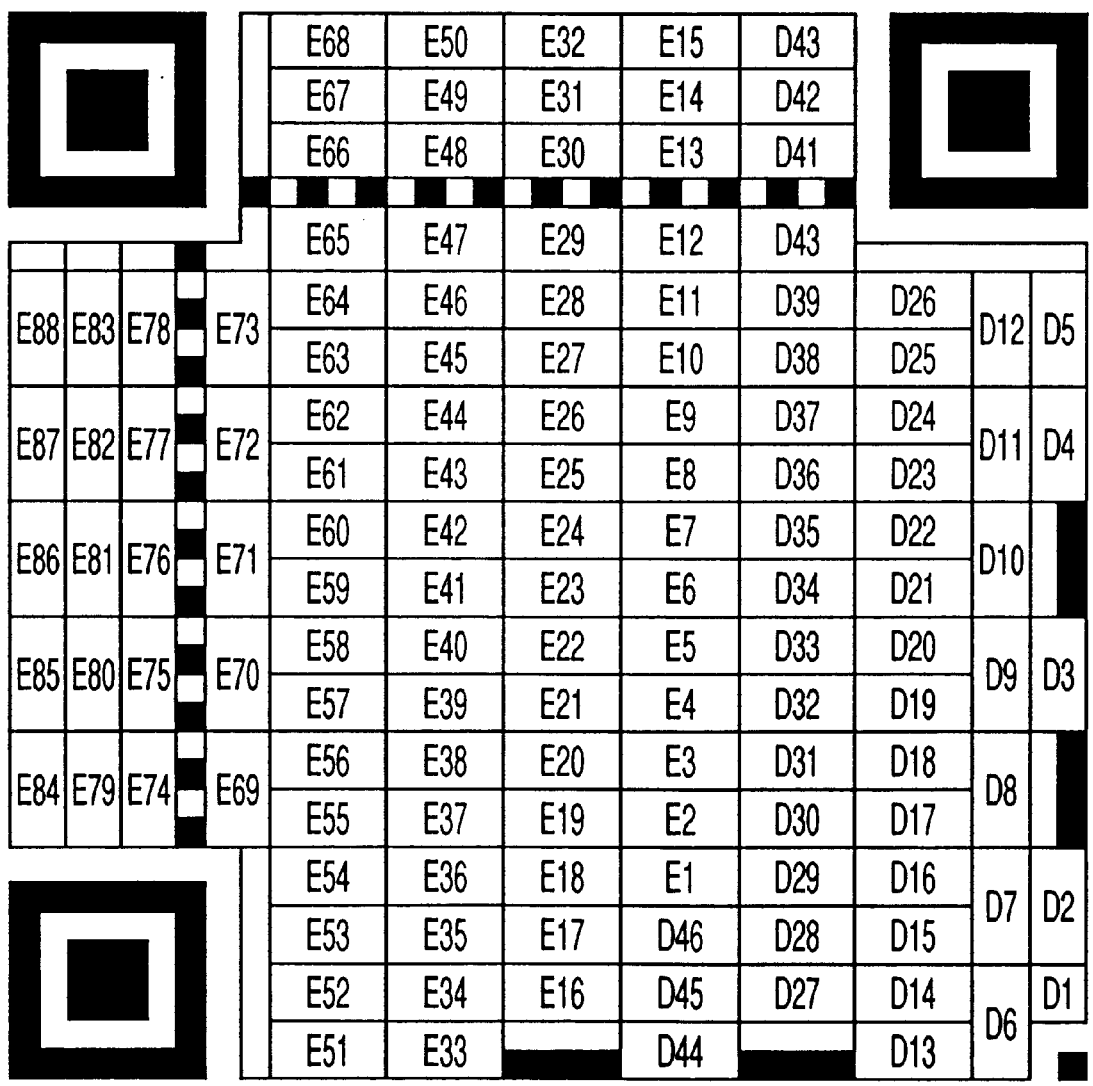
FIG. 5 is a view showing an arrangement of code wards in an information recording region of the two-dimensional code in accordance with the preferable embodiment of the present invention.

The versions 1–8 chiefly represent the difference in the total code ward number. Each code ward is constituted by 8 bits and designated by D1–D46 and E1–E88 in FIG. 5. The code wards D1 to D46 represent a total of 46 data code wards and E1 to E88 represent 88 error-correcting data code wards. This embodiment performs a Reed Solomon (RS) type error-correcting operation. Thus, the error-correcting code ward is referred to as RS code ward. FIG. 5 shows an example corresponding to version 5. The total code ward number becomes 134 based on a summation of 46 data code wards and 88 RS code wards.

Numerals for the data code wards D1–D46 and the RS code wards E1–E88) respectively represent the order in the decoding operation. Namely, the decoding operation starts from D1 to D46, and subsequently continues from E1 to E88. According to this embodiment, as apparent from FIG. 5, the decoding operation is performed from the rightmost row to the leftmost row, from the lowermost end to the uppermost end in each row.

Each code ward is constituted by 8 cells so as to correspond to 8 bits. However, the first data code ward D1 includes only four cells (i.e., four bits). Four zero bits (0000) are added to the head of the first data code ward D1 (4 bits) so as to be processed in the error-correcting Reed Solomon calculation.

A first data block 1 is constituted by the data code wards D1–D23, and a second data block 1 is constituted by data code wards D24–D46. A first RS block 1 is constituted by RS code wards E1–E44, and a second RS block 2 is constituted by RS code wards E45–E88. In this manner, the information recording region 56 is separated into a plurality of blocks.

The error-correcting levels (L, M, Q, H) represent RS code ward number, RS block number, or data code ward number. The example shown in FIG. 5 corresponds to the version 5-H with the RS code ward number 88 and the RS block number 2. As described above, the total code ward number of version 5 is 134. A single data block is constituted by 23 data code wards, and a single RS block is constituted by 44 RS code wards. In other wards, the version 5-L comprises two data sets each consisting of one data block and one RS block.

Regarding other versions 5-L, 5-M and 5-Q, each comprises only one RS block (i.e., RS block number=1). The error-correcting ability decreases in the order of H→Q→M→L.

An allowable damage rate represents the degree (percentage) of allowable damaged code wards in correctly performing the error-correcting operation. The error-correcting ability can be expressed by using the allowable damage rate, in the following manner.

Error-correcting level H - - - approximately 30%
Error-correcting level Q - - - approximately 25%
Error-correcting level M - - - approximately 20%
Error-correcting level L - - - approximately 10%

The relationship between such version information and their contents (total code ward number, RS code ward number, error-correcting ability etc.) is for example stored in RAM of the two-dimensional code reading apparatus 2.

In FIG. 5, specific codes referred to as "indicator" are recorded in a predetermined position of the information recording region 56 consisting of 134 code wards D1–D44 and E1–E88.

Each indicator, consisting of four bits, serves as "recording mode designating code" for indicating what a recorded bit string represents. For example, 0001 represents a figure, 0010 represents an alphabetic character, and 1000 represents a Chinese character. Each indicator defines the recording mode of the data region between this indicator and a next indicator.

Figure 6:
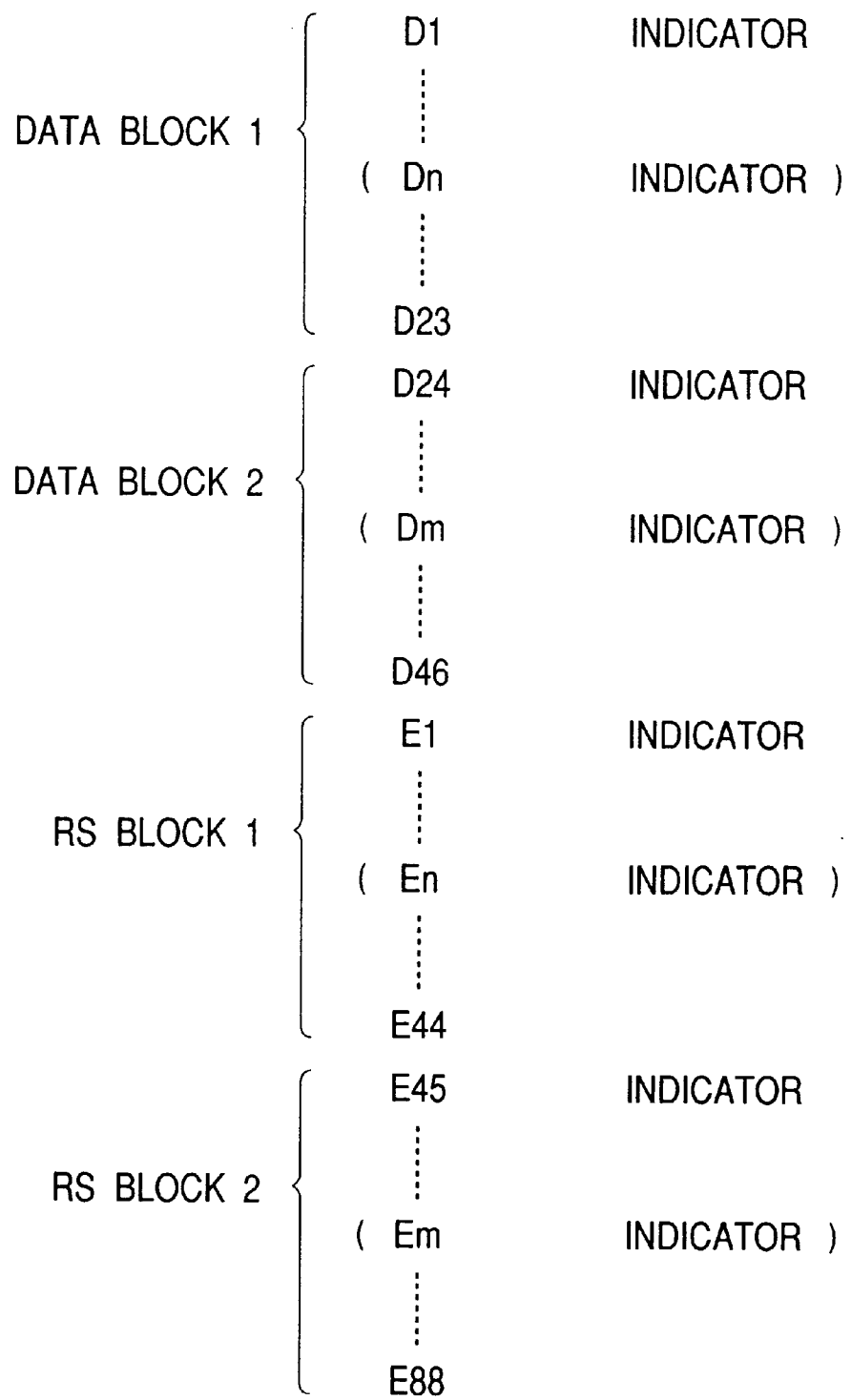
FIG. 6 is a view showing the location of each indicator in the information recording region of the two-dimensional code in accordance with the preferable embodiment of the present invention.

As shown in FIG. 6, a first indicator is recorded in the head (data code ward D1) of the data block 1, and a second indicator is recorded in the head (data code ward D24) of the data block 2. Similarly, a third indicator is recorded in the head (RS code ward E1) of the RS block 1, and a fourth indicator is recorded in the head RS code ward E45) of the RS block 2. Needless to say, additional indicators can be recorded in designated code wards Dn, Dm, En and Em in respective blocks, if the recording mode is changed in the same block.

Locating the indicator to the head of each block brings the following effects.

Figure 10A:
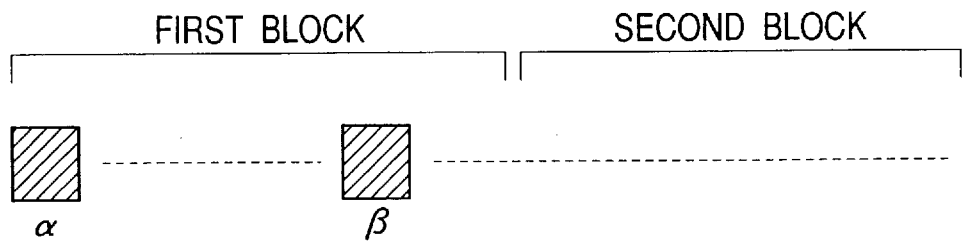
FIG. 10A is a view showing an indicator arrangement in accordance with a comparative example.

FIG. 10A shows a comparative example wherein an indicator α is located at the head of a first block and another indicator β is located at an intermediate position of the first block. In this case, indicator β indicates the recording mode applied to the remaining part of the first block and a succeeding second bock. Thus, no indicator is recorded in the second block.

According to such indicator allocation, if the first block is damaged partly or entirely, the indicator β may not be decoded correctly. In this case, the recording mode of the second block cannot be identified. For example, in the example of FIG. 5, the recording mode (e.g., figures, alphabetical characters, or Chinese characters) of the data block 2 cannot be read when the indicator of the data block 1 is damaged irrespective of normal or abnormal of information recorded in the data block 2.

Figure 10B:
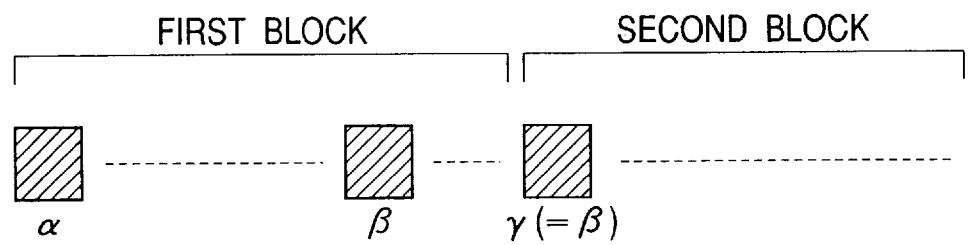
FIG. 10B is a view showing an indicator arrangement in accordance with the preferred embodiment of the present invention.

On the other hand, the present invention allocates an independent indicator γ at the head of the second block even if the additionally provided indicator γ is duplicate with the indicator β (i.e., β=γ) as shown in FIG. 10B. With this indicator allocation, it becomes possible to perform the decoding operation of second block 2 without being influenced by the success or failure in the decoding operation of first block 1. In the case of the example shown in FIG. 5, the data block 1 and data block 2 can be independently decoded when the caused damage is within an error-correctable level for each block. Thus, the recording mode of each data block can be read irrespective of damage of the other data block.

Figure 10C:
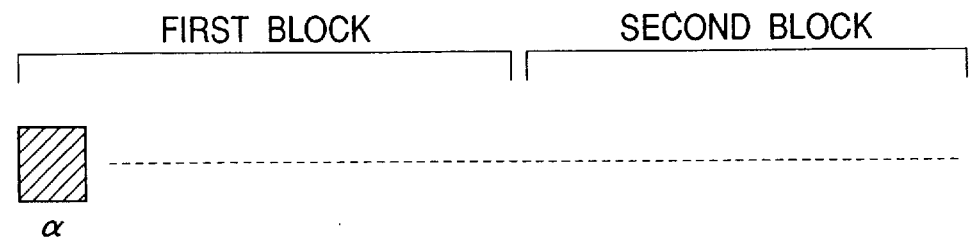
FIG. 10C is a view showing another indicator arrangement in accordance with a comparative example.

FIG. 10C shows another comparative example wherein only one indicator α is provided at the head of the first block for indicating the recording mode applied to both of the first and second blocks.

Figure 10D:
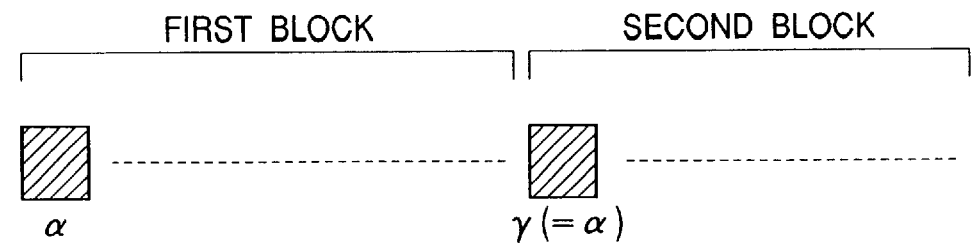
FIG. 10D is a view showing another indicator arrangement in accordance with the preferred embodiment of the present invention.

In such a case, the present invention allocates the indicator γ identical with indicator α (i.e., γ=α) at the head of the second block as shown in FIG. 10D.

As shown in FIG. 1, the two-dimensional code reading apparatus 2 comprises a CCD 4, a binary-coding circuit 6, a picture image memory 8, a clock signal generating circuit 14, an address generating circuit 16, a change point detecting circuit 18, a ratio detecting circuit 20, an address memory 22, and a control circuit 28.

The control circuit 28 is a computer system comprising CPU, ROM, RAM and I/O, wherein CPU executes two-dimensional code reading processing according to the program memorized in ROM and controls components incorporated in the two-dimensional code reading apparatus 2.

Figure 4A:
FIG. 4A is a view showing the signal waveform of an output signal of a CCD.
Figure 4B:
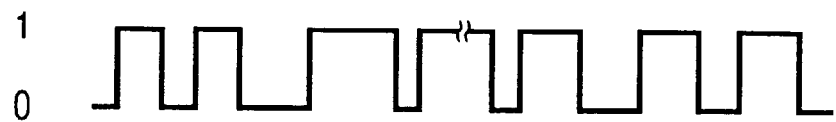
FIG. 4B is a view showing the signal waveform of a binary-coding circuit.

The reading operation of control circuit 28 is performed in the following manner. In response to an instruction of the control circuit 28, the CCD 4 detects a two-dimensional picture image of the two-dimensional code 52 which shifts in a predetermined direction. After finishing detection of the two-dimensional picture image, the CCD 4 generates a multilevel signal representing two-dimensional picture image data as shown in FIG. 4A. The two-dimensional picture image data is then sent to the binary-coding circuit 6. The binary-coding circuit 6 converts the two-dimensional picture image data into binary data with reference to a threshold designated by the control circuit 28. FIG. 4B shows a binary-coded signal having two levels of 1(high) and 0(low).

The clock signal generating circuit 14 generates clock pulse in response to the sync pulse produced from the CCD 4. The clock pulse has a pulse width sufficiently narrower than that of the pulse of the two-dimensional picture image data produced from the CCD 4. The address generating circuit 16 counts the pulse produced from the clock signal generating circuit 14 and generates a signal designating the address of the picture image memory 8. The binary-coded two-dimensional picture image data is written to the designated address of the picture image memory by the units of 8 bits.

The change point detecting circuit 18 detects each change, i.e., "1"→"0" or "0"→"1", of the output signal of the binary-coding circuit 6 and sends a pulse signal to the ratio detecting circuit 20. The ratio detecting circuit 20 counts the clock pulse generated from the clock signal generating circuit 14 during a period between a pulse signal generation and a next pulse generation in the change point detecting circuit 18. Based on the count value of the clock pulse, the ratio detecting circuit 20 detects the continuing length of each bright (1) or dark (0) region involved in the two-dimensional picture image data. Then, the detected ratio of bright (1) and dark (0) regions is compared with the pattern corresponding to the positioning symbols 54A, 54B and 54C of two-dimensional code 52.

Figure 3A:
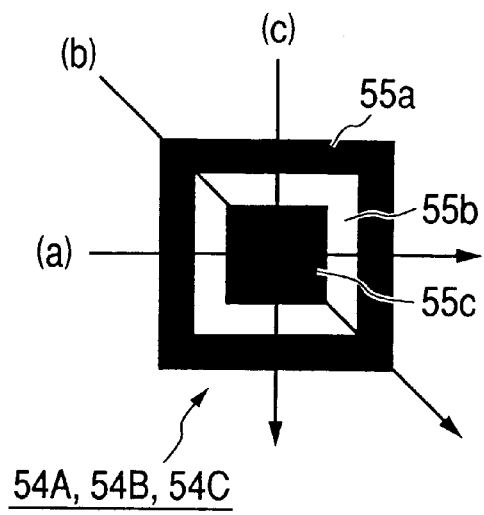
FIG. 3A is a view showing representative scanning lines crossing the center of a positioning symbol in accordance with the preferable embodiment of the present invention.
Figure 3B:
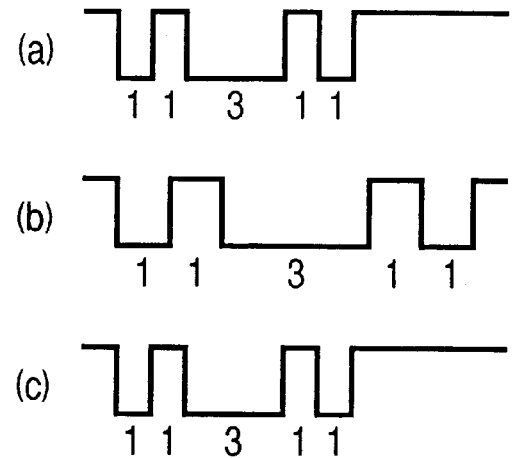
FIG. 3B is a view showing signal waveforms obtained in scanning operations along the representative scanning lines shown in FIG. 3A.

FIG. 3A shows representative straight scanning lines (a), (b) and (c) of CCD 4, each crossing the center of positioning symbols 54A, 54*b* and 54C with a distinctive angle. FIG. 3B shows the binary-coded signals corresponding to the bright and dark patterns detectable along the scanning lines (a), (b) and (c), respectively. The bright and dark pattern obtainable from each of the scanning lines (a), (b) and (c) is as follows:

dark:bright:dark:bright:dark=1:1:3:1:1

This specific bright and dark pattern is obtainable from any straight scanning line having an intermediate angle between the scanning lines (a), (b) and (c) whenever the scanning line crosses the center of the positioning symbol.

When the ratio detecting circuit 20 detects the bright and dark pattern "1:1:3:1:1", the address of the picture image memory 8 generated from the address generating circuit 16 is stored in the address memory 22 at this timing.

Accordingly, when the CCD 4 detects one frame of two-dimensional picture image data, the picture image memory 8 stores the binary-coded two-dimensional picture image data. The address memory 22 stores the address of the detected portion of the positioning symbols 54A, 54b and 54C.

When the first frame of the two-dimensional picture image is obtained, the control circuit 28 performs the two-dimensional code reading processing based on the data store in the address memory 22. After the reading processing is finished, the control circuit 28 causes CCD 4 to detect the next frame of the two-dimensional picture image. Accordingly, the next two-dimensional picture image is sent from CCD 4 to the binary-coding circuit 6. The above-described processing is repeated.

Next, the picture image of the detected frame of two-dimensional code 52 is stored in the picture image memory 8 and the address of the positioning symbols 54A, 54B and 54C are stored in the address memory 22. Then, the control circuit 28 executes the two-dimensional code reading processing. Hereinafter, the two-dimensional code reading processing will be explained with reference to the flowcharts shown in FIGS. 7 to 9.

Figure 7:
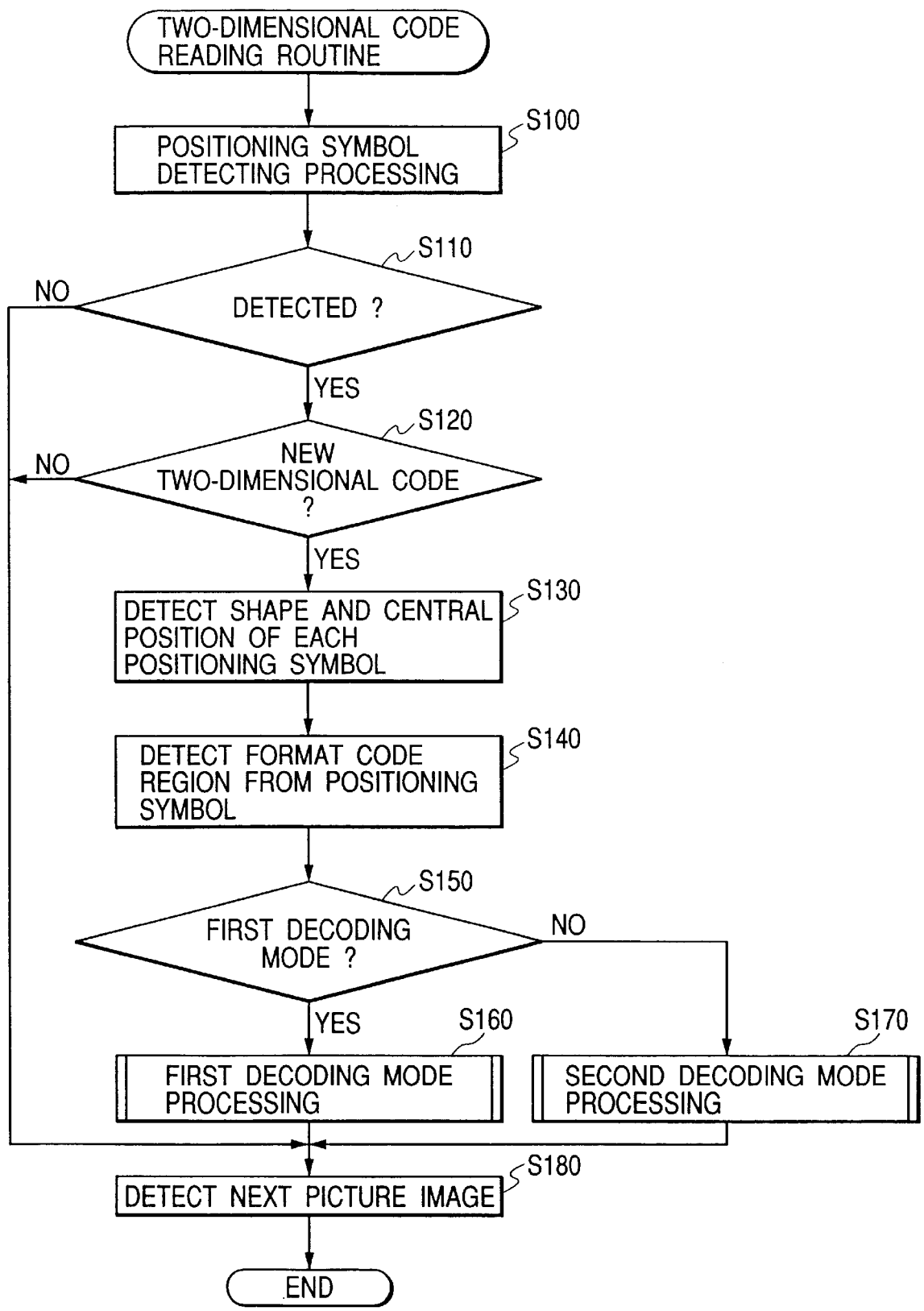
FIG. 7 is a flowchart showing a two-dimensional code reading processing in accordance with the preferable embodiment of the present invention.

FIG. 7 is a flowchart showing a two-dimensional code reading processing in accordance with a preferable embodiment of the present invention.

First, in step S100, the positioning symbol detecting processing is performed in the following manner.

The picture image memory 8 and the address memory 22 are accessed to check whether all of positioning symbols 54A, 54B and 54C are located at appropriate positions and also to determine an accurate shape and the central positions of positioning symbols 54A, 54B and 54C on the picture image.

More specifically, with reference to picture images stored in the picture image memory 8 and address values stored in the address memory 22, it is checked whether addresses of positioning symbols 54A, 54B and 54C stored in the address memory 22 can be classified into three groups discriminable in their positions. Furthermore, the shape of each positioning symbol 54A, 54B or 54C and its central position are determined based on the 1(white)/0(black) pattern of picture image stored in the picture image memory 8. And, it is checked whether three positioning symbols 54A, 54B and 54C are accurately located in accordance with the positional relationship shown in FIG. 2.

After completing the positioning symbol detecting processing, it is checked in step S110 whether all of three positioning symbols 54A, 54B and 54C are accurately detected. When the judgement is NO in the step S110, the control flow proceeds to step S180 to generate an instruction causing CCD 4 to detect the next picture image. Then, this routine is completed.

When all of three positioning symbols 54A, 54B and 54C are accurately detected (i.e., YES in step S110), the control flow proceeds to step S120 to check whether the detected code is a new two-dimensional code 52. This processing is necessary to prevent the same code from being processed unnecessarily. Thus, when the detected code is identical with the previously detected one (i.e., NO in step S120), the control flow proceeds to step S180 to generate the instruction to cause CCD 4 to detect the next picture image. Then, this routine is completed.

When the detected code is a new two-dimensional code 52 (i.e., YES in step S120), the shape of positioning symbols 54A, 54B and 54C and their central positions are detected in step S130. In other words, the position of each cell constituting the positioning symbols 54A, 54B and 54C is calculated.

Namely, as shown in FIGS. 2 and 3A, each of positioning symbols 54A, 54B and 54C has a size of 7 cells×7 cells. Thus, the picture image of each positioning symbol stored in the picture image memory 8 is divided by 7 to obtain the height and width, i.e., shape, of each cell.

Next, each cell position of positioning symbols 54A, 54B and 54C is determined based on the obtained height and width of each cell.

Subsequently, in step S140, detection of the format code region 70 is performed based on the positioning symbol 54A. The format code region 70 is located in parallel with the rightmost vertical cell row (i.e., black vertical cell row of rectangular frame-like zone 55a) of the positioning symbol 54A, with a one-cell gap zone formed between them. Thus, the position of format code region 70 is detectable with reference to this positional relationship.

Next, it is checked in step S150 whether a first decoding mode is set. According to this embodiment, there are two decoding modes which are selected by a user.

The first decoding mode is a combination of entire decode processing and partial decode processing. The entire decode processing is performed to decode all of cells constituting the information recording region 56. The partial decode processing is performed to decode the cells of a designated block. In the first decoding mode, the entire decode processing is chiefly performed. The partial decode processing is performed only when the entire decode processing is failed.

On the other hand, a second decoding mode includes the partial decode processing only.

The user can select the first decoding mode or the second decoding mode by using a switch or the like.

When the first decoding mode is selected (i.e., YES in step S150), the control flow proceeds to step S160. When the second decoding mode is selected (i.e., NO in step S150), the control flow proceeds to step S170.

Figure 8:
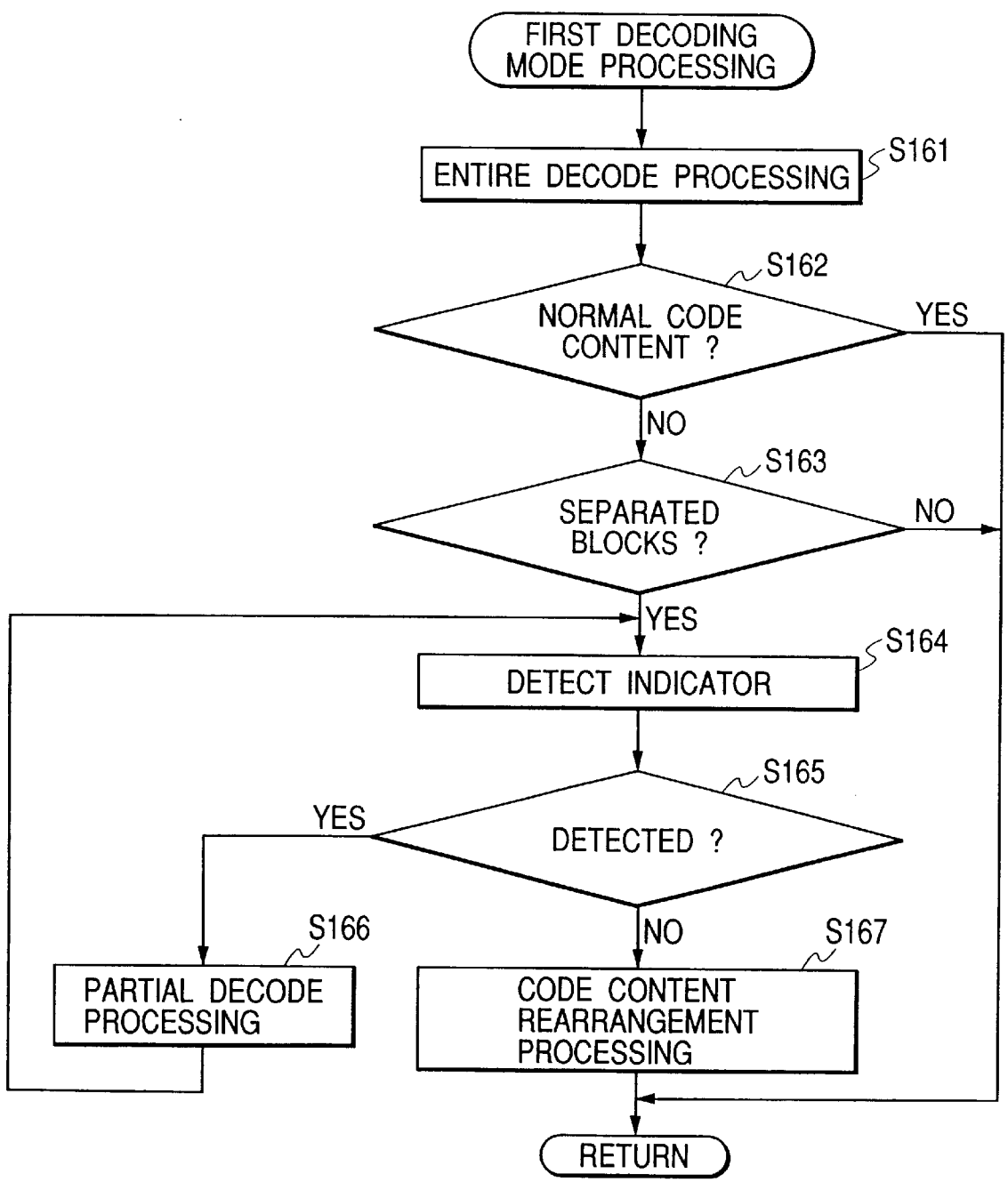
FIG. 8 is a flowchart showing the detailed processing of a first decoding mode performed in the reading processing shown in FIG. 7.

FIG. 8 is a flowchart showing the detailed processing of the first decoding mode (step S160).

First, in step S161, the entire decode processing is executed. More specifically, an area is identified based on the format code region 70 detected in step S140. This area includes the information recording region 56 of two-dimensional code 52 corresponding to the code version identified by the format code region 70. According to this embodiment, an existing area and largeness of each cell can be known as each cell size is constant. Thus, the central position of each data cell in the information recording region 56 is determined based on the shape and central position of the positioning symbols 54A, 54B and 54C detected in the step S130 of FIG. 7. The binary-coded data is read from the pixel of the central position of each data cell. The type of each cell is determined. The code content is obtained. Namely, all of code wards in the information recording region 56 is decoded.

In this entire decode processing, it is possible to execute optional processing based on the format information obtained from format code region 70. For example, as shown in FIG. 5, the code ward is basically constituted by 2 cells×4 cells. Some code wards are arranged vertically, and other code wards are arranged laterally. The format code region 70 includes the information relating to such an arrangement of the cell group constituting each code ward. Thus, the optional processing is performed to check the cell arrangement of each code ward.

After completing the entire decode processing of step S161, it is checked whether the decoded code content is normal or abnormal. In the entire decode processing in the step S161, the error-correcting operation is performed by using RS code ward. Thus, it is possible to obtain normal code content when the damage is within an error-correctable level. In other words, the obtained code content will be abnormal if the damage exceeds the error-correctable level.

When the code content is normal (i.e., YES in step S162), this subroutine is completed. The control flow returns to step S180 of FIG. 7. When the code content is abnormal (i.e., NO in step S162), the control flow proceeds to step S163.

In the step S163, it is checked whether the information recording region 56 is separated into a plurality of blocks. When the information recording region 56 is not divided (i.e., NO in step S163), there is no blocks to be independently decoded. Thus, this subroutine is completed.

On the other hand, when the information recording region 56 is separated into a plurality of blocks (i.e., YES in step S163), the control flow proceeds to step S164 to perform an indicator search according to the decoding order (i.e., D1→ - - - D46→E1→ - - - E88). When any indicator is detected (i.e, YES in step S165), the control flow proceeds to step S166 to decode the block involving the detected indicator. In other words, the partial decode processing is performed about the block specified by this indicator.

Thereafter, the control flow returns to step S164 to detect the next indicator. The decode processing of the step S166 is performed every time a new indicator is detected. When no indicator is detected (i.e., NO in step S165), the control flow proceeds to step S167. According to the above-described decode processing, the decoding operation of each block is independently performed according to the recording mode designated by the indicator.

In the step S167, a code content rearrangement processing is performed. In this code rearrangement processing, the decoded contents of respective blocks can be connected in an intended manner. Of course, it is possible to leave the decoded contents without being combined with others. Furthermore, it is possible to combine the code contents of specific blocks only.

After finishing the code content rearrangement processing of step S167, this subroutine is completed. The control flow returns to the step S180 of FIG. 7.

Figure 9:
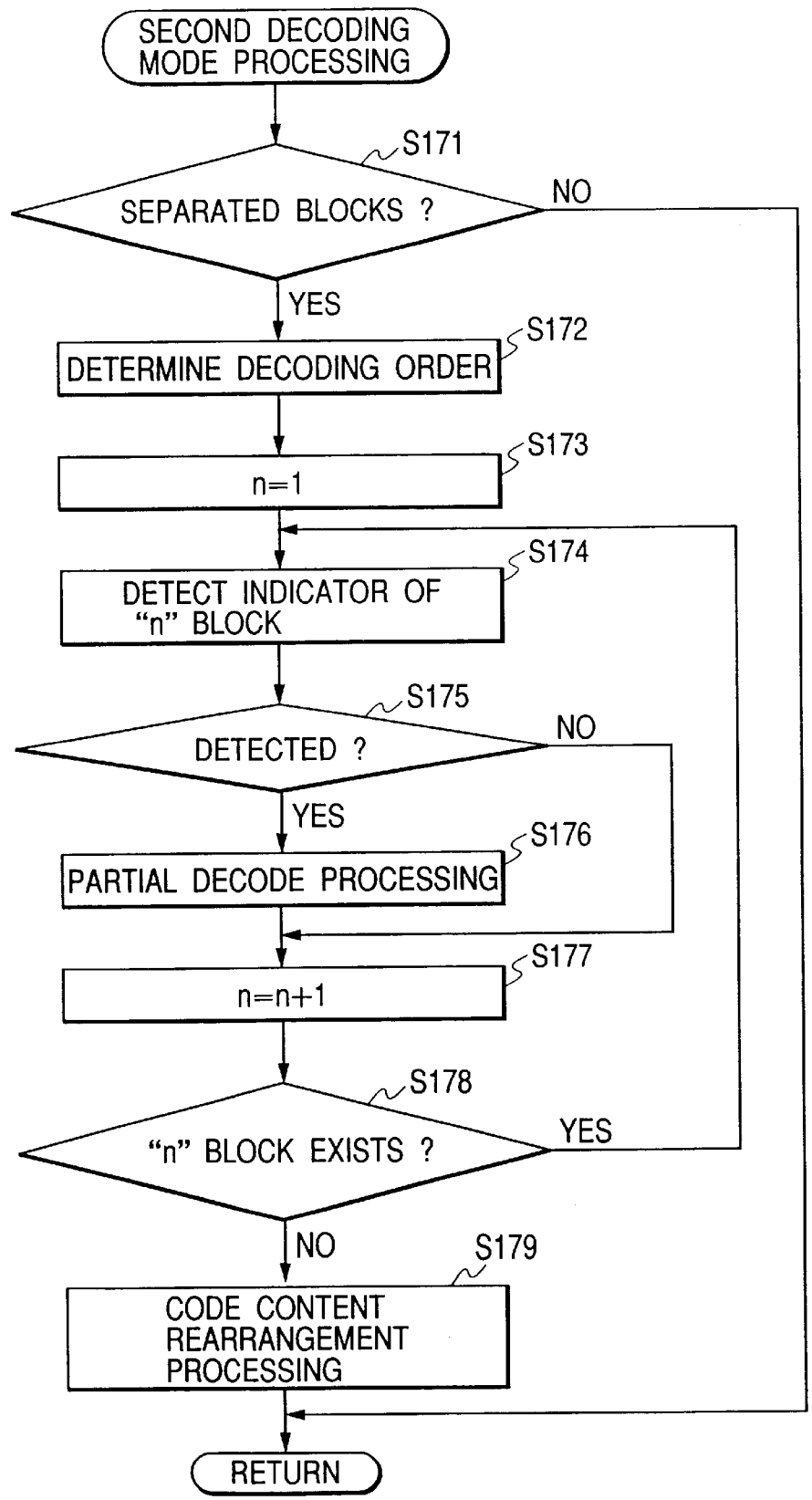
FIG. 9 is a flowchart showing the detailed processing of a second decoding mode performed in the reading processing shown in FIG. 7.

FIG. 9 is a flowchart showing the detailed processing of the second decoding mode (step S170).

First, in step S171, it is checked whether the information recording region 56 is separated into a plurality of blocks. When the information recording region 56 is not divided (i.e., NO in step S171), there is no blocks to be independently decoded. Thus, this subroutine is completed.

On the other hand, when the information recording region 56 is separated into a plurality of blocks (i.e., YES in step S171), the control flow proceeds to step S172 to determine the decoding order. As the code version is known from the format code region 70 detected in the step S140 of FIG. 7, it is possible to identify the total number and the location of the blocks existing in the information recording region 56. Then, the decoding order is determined. For example, according to the example shown in FIG. 5, the decoding order of four blocks (i.e., two data blocks and two RS blocks) is determined. The decoding order may be "data block 1→data block 2→RS block 1→RS block 2. However, the decoding operation needs not be always performed in this order. Thus, it is possible to flexibly change the decoding order in the step S172.

After the decoding order is determined, the control flow proceeds to step S173 to set an ordering number "n" to 1 (i.e., n=1) and then proceeds to step S174 to detect the indicator of a block identified by the ordering number "n." When no indicator is detected (i.e., NO in step S175), the control flow proceeds to step S177. When any indicator is detected (i.e, YES in step S175), the control flow proceeds to step S176 to decode the block involving the detected indicator. In other words, the partial decode processing is performed about the block specified by this indicator. Then, the control flow proceeds to step S177.

In step S177, the ordering number is incremented (i.e., n=n+1). Thereafter, the control flow proceeds to step S178 to judge whether there is a block specified by the incremented ordering number "n." When the judgement result is YES in the step S178, the control flow returns to step S174. Thus, the steps S174 to S178 are repeated again.

When no block remains (i.e., NO in step S178), the control flow proceeds to step S179 to execute the code content rearrangement processing in the same manner as in the above-described step S167 of FIG. 8.

After finishing the code content rearrangement processing of step S179, this subroutine is completed. The control flow returns to the step S180 of FIG. 7.

As described above, according to the two-dimensional code reading apparatus 2 of this embodiment, a plurality of blocks are independently decoded. The decoding operation of each block is performed based on the recording mode identified by the indicator located at the head of each block. In other words, the partial decoding is applied to each block without being influenced by the decoding result of other blocks. Thus, the content of two-dimensional code 52 can be detected as summed-up information obtained from the plurality of blocks.

Figure 20:
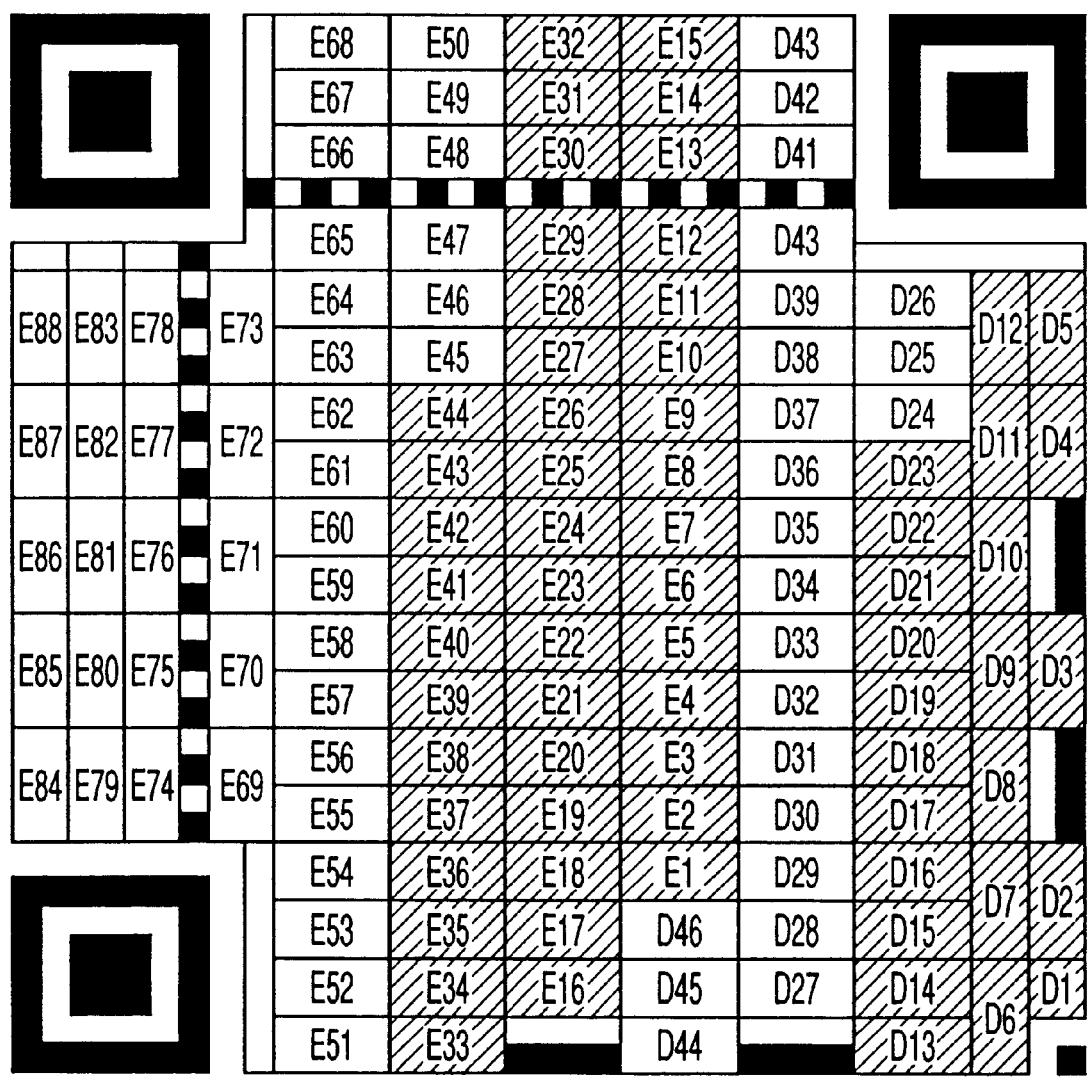
FIG. 20 is a view showing damaged code words in the information recording region of the two-dimensional code.

It is now assumed that the two-dimensional code (QR code) is damaged partly as shown in FIG. 20. All of data code wards D1–D23 constituting data block 1 and RS code wards E1–E44 constituting RS block 1 are subjected to damage (refer to dot meshed portions). The damage rate of code wards is 67/134=50%. In this case, according to the conventional code reading technique, it is judged that the damaged condition is fatal and no data reading is feasible based on the result that the damage rate (50%) exceeds the allowable upper limit (approximately 30%) of error-correcting ability of version 5-H.

However, as understood from FIG. 20, all of data code wards D24–D46 constituting data block 2 are not damaged. The damage rate (=0) is within the error-correctable level. Thus, the data reading operation will be feasible by decoding this portion. In this manner, even when the overall damage rate is high, some blocks may have a low damage rate. Accordingly, separating the data block into a plurality of blocks each being specified by a heading indicator is effective to increase a substantial error-correctable region without sacrificing many of normal code wards.

As described above, this embodiment makes it possible to decode each block independently by disposing the indicator at the head of each block. In the case of the example shown in FIG. 20, the code of data block 2 can be accurately decoded.

As described above, the code reading processing of this embodiment is based on the first decoding mode (S160) and the second decoding mode (S170) which are selectively performed.

The first decoding mode is characterized in that the entire decode processing (S161) is chiefly executed and the partial decode processing (S164–S167) is occasionally executed only when entire decode processing is failed (i.e., NO in step S162). Therefore, selecting the first decoding mode is advantageous when the damage exceeding the error-correctable level of the information recording region 56 seldom occurs.

On the other hand, selecting the second decoding mode is advantageous when the damage exceeding the error-correctable level of the information recording region 56 often occurs.

The present invention is not limited to the above-described embodiment and therefore can be modified in various ways.

(1) The indicator position is not limited to the head of a block. It is therefore possible to locate the indicator at an intermediate position in the block, although the decoding operation needs to be retroactively performed.

(2) It is also possible to create an existing area indication code in the block for directly or indirectly identifying the existing area of the block (i.e., identifying the existing area of the block in the information recording region 56), instead of using the table of RAM in the control circuit 28 of the two-dimensional code reading apparatus 2 for storing the relationship between the version information and their contents (total code ward number, RS code ward number, error-correcting ability etc.). In this case, the existing area indication code is detected from the picture image of a two-dimensional code. The block to be decoded is identified based on the detected existing area indication code. Then, the partial decoding operation is applied to the identified block. It is preferable to integrate the existing area indication code and the indicator into a same code ward, so that the indicator and the existing area indication code can be successively identified.

(3) The two-dimensional code 52 is not limited to QR code, and therefore can be replaced by any other two-dimensional code.

Figure 11A:
FIG. 11A is a view showing another positioning symbol pattern.
Figure 11B:
FIG. 11B is a view showing another positioning symbol pattern.
Figure 11C:
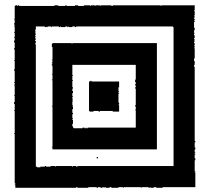
FIG. 11C is a view showing another positioning symbol pattern.

(4) The pattern of positioning symbols 54A, 54b and 54C is not limited to the one disclosed in FIG. 2. For example, the positioning symbol pattern can be replaced by a circular pattern shown in FIG. 11A, a hexagonal pattern shown in FIG. 11B, or other polygonal patterns. Furthermore, the multilayered zones of the positioning symbol pattern can be adequately increased as shown in FIG. 11C. In any case, it is essentially required that the same bright and dark pattern is always obtained regardless of the angle of a scanning line crossing the center of the positioning symbol.

(5) The peripheral shape of two-dimensional code 52 is not limited to the square shown in FIG. 2, and therefore can be replaced by an oblong. The arrangement of positioning symbols 54A, 54b and 54C is not limited to the one disclosed in FIG. 2, and therefore can be changed flexibly. For example, it is possible to provide four positioning symbols.

(6) The number of positioning symbols can be reduced to two. In this case, two positioning symbols should be located in a diagonal relationship.

(7) The detection of positioning symbols 54A, 54b and 54C is not limited to the disclosed hardware arrangement using the ratio detecting circuit 20. For example, a software arrangement can be used.

Figure 12:
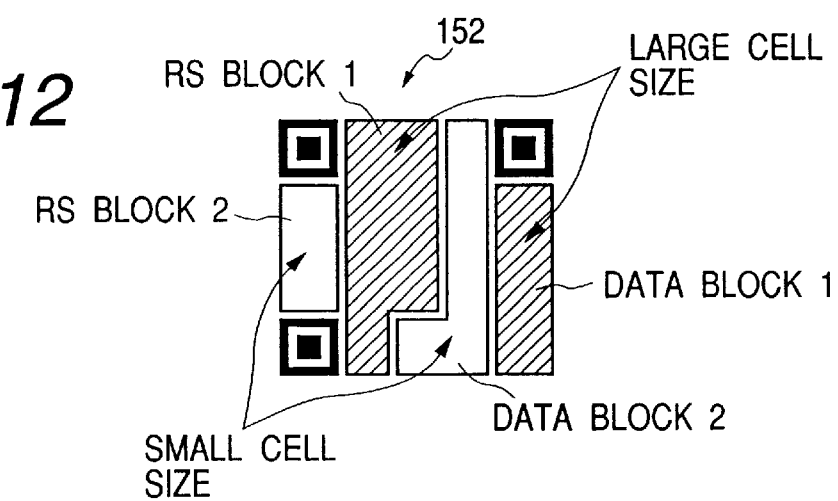
FIG. 12 is a schematic view showing an arrangement of a two-dimensional code in accordance with another embodiment of the present invention.

(8) Furthermore, cell size of cells constituting two-dimensional code 52 needs not be always identical. For example, as shown in FIG. 12, it is desirable to use different cell size for each block. It is desirable to use a large cell size for high-priority information, because the large cell size is robust against stain or bad print. When the data block is paired with an error-correcting block, it is preferable to use the same cell size for each of the paired blocks as shown in FIG. 12.

Figure 13:
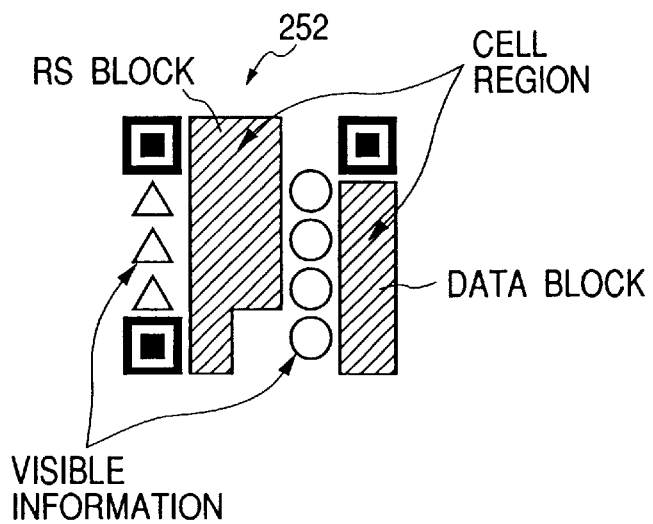
FIG. 13 is a schematic view showing an arrangement of a two-dimensional code in accordance with another embodiment of the present invention.

(9) It is also preferable to provide a block having no cells in a two-dimensional code 252 as shown in FIG. 13. In this case, it becomes possible to print the information visually recognizable or perceivable, such as figures, alphabetic characters, Chinese characters, on the surface of two-dimensional code 252. For example, such a cell-less block can be used for indicating a personal name (like a credit or cash card with embossed personal name) when personal information is recorded in the cells of another block. In other case, the visually recognizable or perceivable information may be a theme or subject representing the recorded data. This is advantageous in administrating the recorded data of the two-dimensional code 252.

Figure 14:
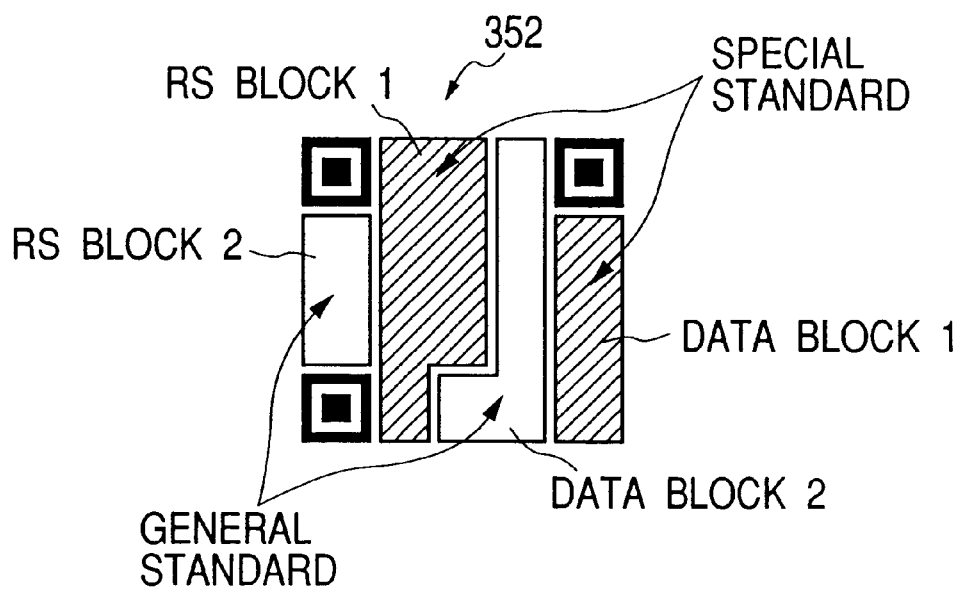
FIG. 14 is a schematic view showing an arrangement of a two-dimensional code in accordance with another embodiment of the present invention.

(10) Furthermore, as shown FIG. 14, it is preferable to provide a two-dimensional code 352 having a specific block which is not readily decodable by an ordinary reading apparatus. Namely, the two-dimensional code 352 comprises a data region recorded according to the "special standard" requiring a special reading apparatus in addition to a data region recorded according to the "general standard" decodable by an ordinary reading apparatus. When the data block is paired with an error-correcting block, it is preferable to use the same "standard" for each of the paired blocks as shown in FIG. 12.

It is practically desirable to use an optically non-recognizable ink, such as magnetic ink or special ink modifying a specific waveform, which is conventionally available for check, bill and bank note.

The data region recorded according to the "special standard" can be enciphered to maintain the recorded information in secret. In this case, a deciphering operation is additionally required in the code reading operation. For example, health check data contain private information. Company's in-house materials may contain confidential information. Such private or confidential information should be decoded by using a specialized reading apparatus. Meanwhile, general information, such as name and theme, should be easily decoded by an ordinary reading apparatus. Thus, using the two-dimensional code 352 is effective in keeping the secrecy of private or confidential information and also adequately maintaining administrative work efficiency.

Figure 15:
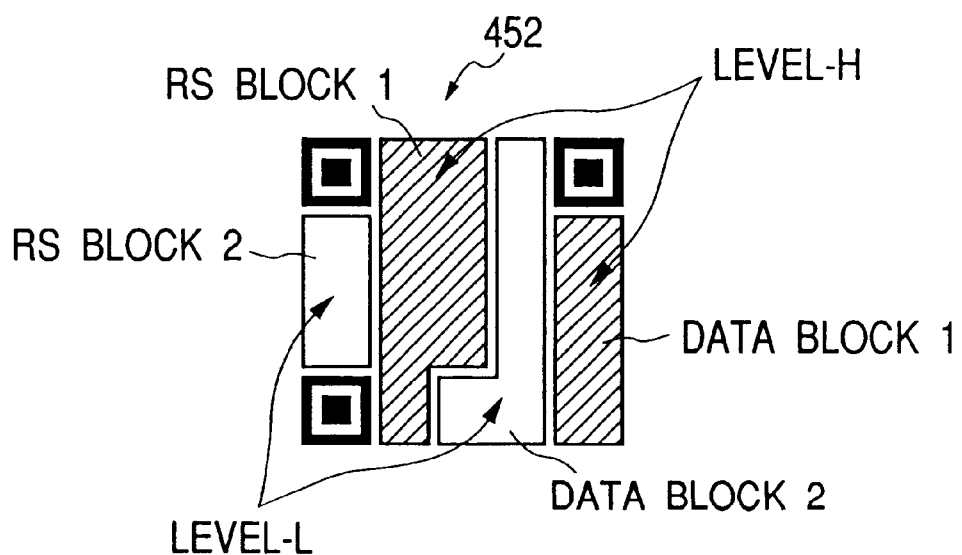
FIG. 15 is a schematic view showing an arrangement of a two-dimensional code in accordance with another embodiment of the present invention.

(11) Furthermore, the error-correcting level can be differentiated for each pair of blocks. For example, as shown in FIG. 15, it is preferable to provide a two-dimensional code 452 applying the error-correcting level H to a first pair of data block 1+RS block 1 and the error-correcting level L to a second pair of data block 2+RS block 2. This makes it possible to selectively determine the error-correcting level of each pair of blocks according to the priority level of the recorded information.

In this case, it is preferable that the above-described indicator includes a code for indicating a designated error-correcting level of each pair of blocks. For example, the error-correcting level indication code may be a combination of a common bit-string (e.g., 000000) and a succeeding attribute bit-string (indicating the designated error-correcting level) placed on the head of the indicator.

For example, the attribute bit-string is determined in the following manner.

Error-correcting level M - - - bit-string 00
Error-correcting level L - - - bit-string 01
Error-correcting level Q - - - bit-string 11
Error-correcting level H - - - bit-string 10

In the reading operation of the two-dimensional code 452, the partial decode processing is applied to each block with reference to the error-correcting level indicated by the error-correcting level indication code.

Figure 16:
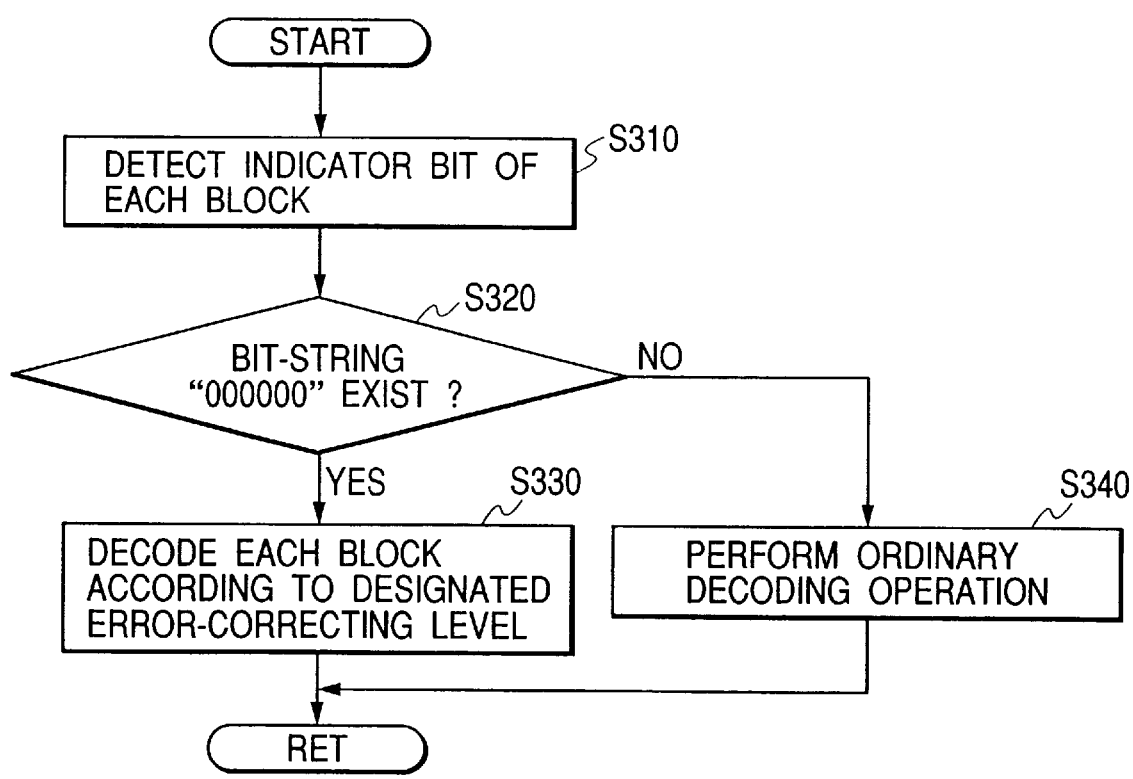
FIG. 16 is a flowchart showing a method for decoding the two-dimensional code shown in FIG. 15.

FIG. 16 is a flowchart showing such a decoding operation.

First, in step S310, the indicator located at the head of each block is detected. Then, in step S320, it is checked whether the indicator includes the bitstring "000000". When the bit-string "000000" is found (YES in step S320), the control flow proceeds to step S330 to detect the designated error-correcting level based on the attribute bit-string. And then, the partial decode processing is applied to this block with reference to the designated error-correcting level.

When no bit-string is found (NO in step S320), the control flow proceeds to step S340 to perform an ordinary decoding operation with reference to the version information (i.e., an overall error-correcting level applied to all of the recorded information) obtained from the format code region 70 shown in FIG. 2.

Next, the method for producing the two-dimensional code 452 will be explained with reference to the flowchart shown in FIG. 17. Usually, the two-dimensional code 452 is printed on a sheet by using a printer which may be incorporated in a computer system together with a keyboard, a mouse, and a display.

First, all of information is encoded in accordance with a predetermined error-correcting level designated as an initial value. When the error-correcting level of each pair of blocks is differentiated from others, the code encoding operation is performed again according to each designated error-correcting level. Then, it is checked whether the coded information is accommodated in a given space (i.e., a corresponding block). This judgement is referred to as "overflow" judgement. When the decoded information overflows the corresponding block, the encoding operation is repeated by using another format having a wider information recording region until the encoded information fits the block.

By doing this, it becomes possible to assign higher error-correcting levels to high-priority information while all the information is surely encoded in the information recording region.

In this case, it is preferable to incorporate the error-correcting level indication code into each block.

To start the code producing processing explained with reference to the flowchart shown in FIG. 17, the following preparation needs to be done beforehand by a user:

(I) Designation of mode; i.e., a variable mode in which an error-correcting level of each block is independently changeable or an ordinary mode in which error-correcting level is same for all blocks; and (II) Designation of a desirable error-correcting level; i.e., H, Q, M or L.

Figure 17:
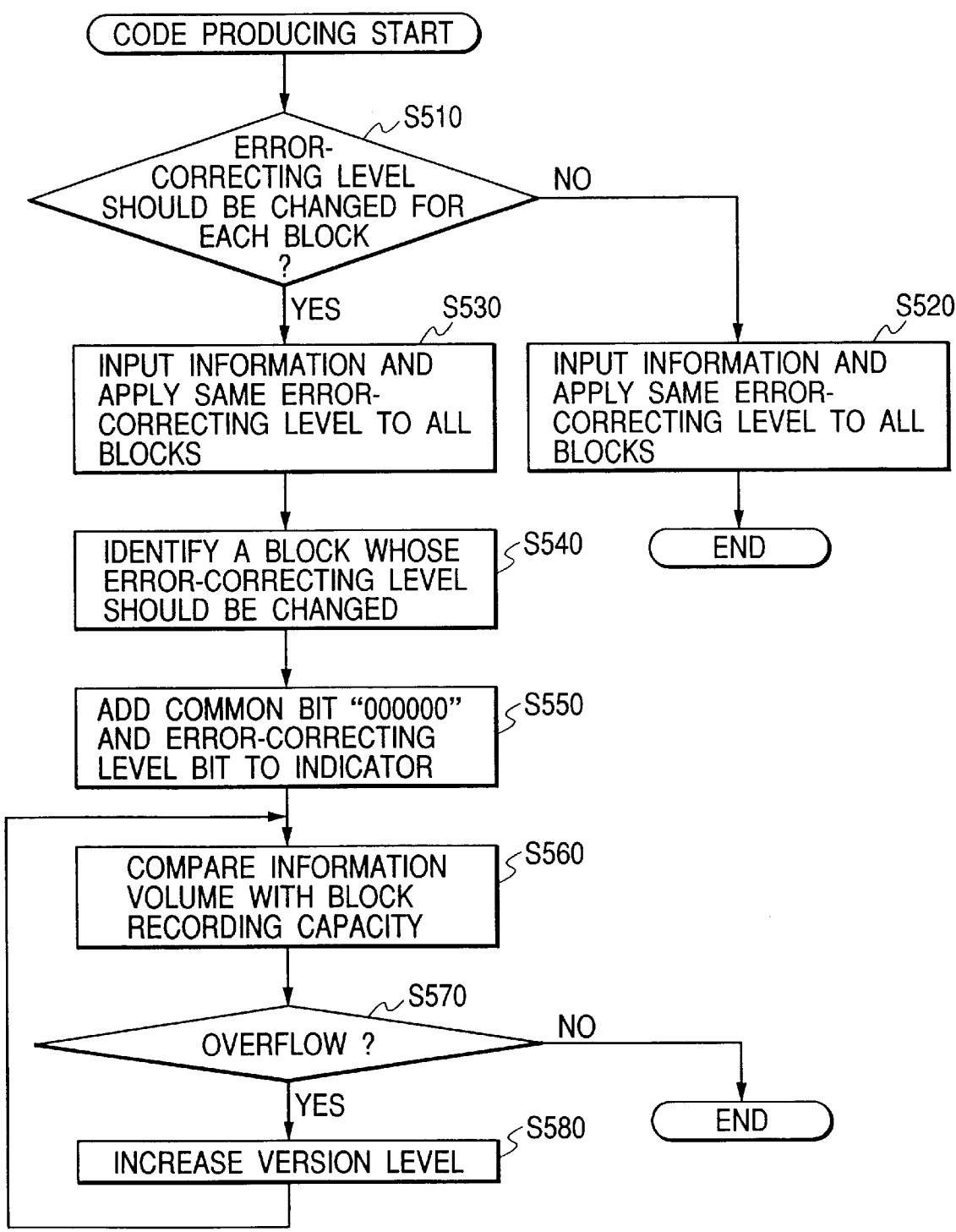
FIG. 17 is a flowchart showing a method for producing the two-dimensional code shown in FIG. 17.
Figure 18A:
FIG. 18A is a view showing a conventional bar code.
Figure 18B:
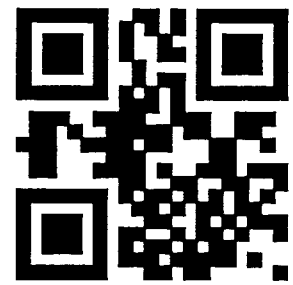
FIG. 18B is a view showing a conventional two-dimensional code.
Figure 19:
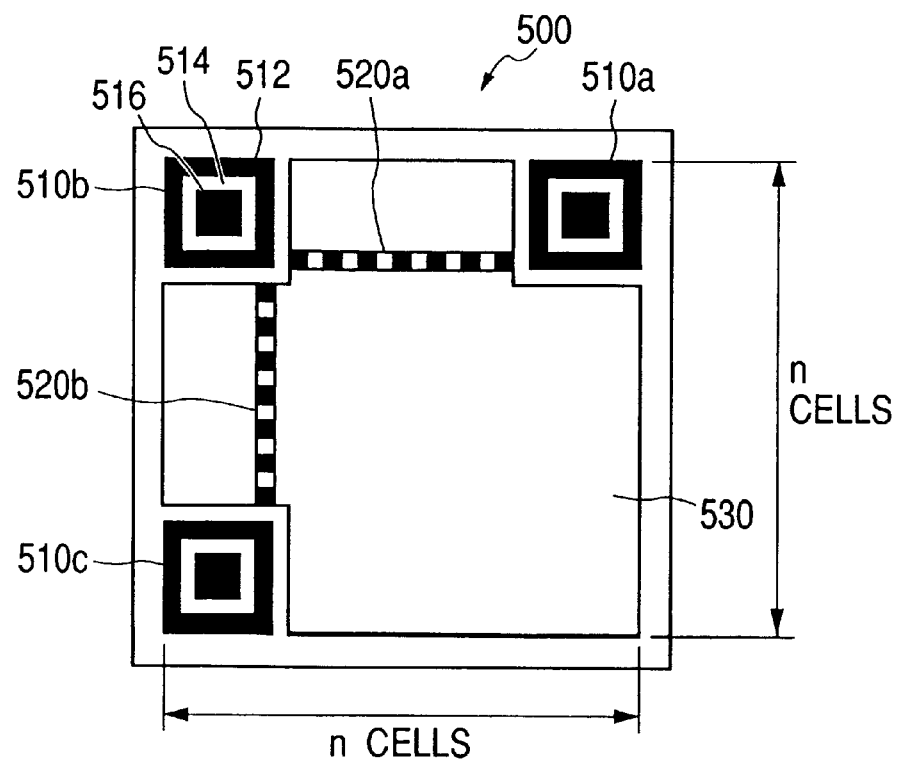
FIG. 19 is a view showing an arrangement of the conventional two-dimensional code.

After starting the flowchart of FIG. 17, it is judged in step S510 whether the error-correcting level should be changed for each block according to the user's setting.

When no differentiation is necessary (i.e., NO in step S510), the control flow proceeds to step S520 to input the information to be encoded and apply a same error-correcting level to all of blocks. In this case, no error-correcting information is included in the indicator of each block. Thus, the judgement result becomes NO in the step S320 of FIG. 16. The ordinary decoding operation is performed (step S340).

On the other hand, when the error-correcting level is changed for each block (i.e. YES in step S510), the control flow proceeds to step S530 to input the information to be encoded and apply a same error-correcting level to all of blocks in the same manner as in the step S520.

Next, in step S540, a request is received regarding a block whose error-correcting level should be changed. For example, a predetermined reception window is opened on the display screen so that the user can arbitrarily change the error-correcting level trough the keyboard.

In the next step S550, the common bit-string "000000" and the above-described attribute bit-string (2 bits: 00(M), 01(L), 11(Q) and 10(H)) are added to the indicator located at the head of an objective block whose error-correcting level should be changed.

Next, in step S560, the information volume according to the renewed error-correcting level is compared with a recording capacity of the corresponding block. Then, in step S570, it is checked whether the information overflows the block (i.e., information volume>block recording capacity).

When no overflow occurs (i.e., NO in step S570), the code producing operation is completed.

When the information overflows the block (i.e., YES in step S570), the control flow proceeds to step S580 to change (increase) the version level. Then, the control flow returns to the step S560 to repeat the steps S560 through S570 until no overflow occurs (i.e., NO in step S570).

In selecting a new version level, the bit number representing the degree of a caused overflow may be taken into consideration so that the version level smoothly fits to the information.

The code, produced in accordance with the flowchart shown in FIG. 17, is then converted into print data and finally printed on the sheet.

A software program comprising the processing performed in accordance with the flowcharts shown in FIGS. 7, 8, 9, 16, and 17 is stored in a recording medium, such as a memory (ROM, back-up RAM) or a built-in hard disk drive, which is pre-installable in the microcomputer. However, it is possible to store the software program in a portable recording medium, such as a floppy disk, a magneto-optical (MO) disk, a CD-ROM, an external hard disk drive and a DVD (digital versatile disk), so that the software program can be arbitrarily loaded from such a recording medium to the microcomputer.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A two-dimensional code including a plurality of cells arranged in a predetermined two-dimensional pattern, said code comprising:

an information recording region for recording information;

a plurality of blocks constituting said information recording region; and a recording mode designating code involved in each block, said recording mode designating code indicating a recording mode of the information recorded in each block, wherein said recording mode designating code of each block is disposed in front of the information recorded in said block so that said recording mode designating code is decoded prior to said information in each block and said information is decoded according to the recording mode specified by said recording mode designating code.

2. The two-dimensional code in accordance with claim 1, wherein at least one of said plurality of blocks records error-correcting information applied to information recorded in another block.

3. The two-dimensional code in accordance with claim 2, wherein said plurality of blocks include a plurality of block pairs, each block pair consisting of a data block and an error-correcting block, an error-correcting level is independently applied to each block pair, and an error-correcting code is involved in each of said data block and said error-correcting block of said block pair, said error-correcting code indicating the error-correcting level of said block pair.

4. The two-dimensional code in accordance with claim 1, wherein an area code is involved in each block of said two-dimensional code for directly or indirectly indicating an existing area of each block in said two-dimensional code.

5. The two-dimensional code in accordance with claim 4, wherein said area code is disposed at the head of each block so that said area code is decoded prior to the information recorded in each block.

6. The two-dimensional code in accordance with claim 4, wherein said recording mode designating code and said area code are represented by a cell distribution pattern, said cell distribution pattern is decodable into a bit string which is not used for recording the information in said information recording region, and said recording mode designating code and said area code are specified by decoding said bit string.

7. The two-dimensional code in accordance with claim 4, wherein said recording mode designating code and said area code are located adjacent to each other so that said recording mode designating code and said area code are successively decoded.

8. The two-dimensional code in accordance with claim 1, wherein a format code region represented by a cell pattern is provided to specify an existing area of each block.

9. The two-dimensional code in accordance with claim 1, wherein a plurality of positioning symbols are provided at predetermined positions on said two-dimensional code to identify the position of said two-dimensional code.

10. The two-dimensional code in accordance with claim 1, wherein at least one of said plurality of blocks contains specific information requiring a specialized reading apparatus in a decoding operation.

11. The two-dimensional code in accordance with claim 10, wherein said specific information is recorded by using magnetic ink or special ink modifying a specific waveform so that said specific information is not optically recognized.

12. The two-dimensional code in accordance with claim 10, wherein said specific information is enciphered so that a deciphering operation is additionally required in a code reading operation.

13. A method for reading a two-dimensional code, said reading method comprising the steps of:

providing a two-dimensional code including a plurality of cells arranged in a predetermined two-dimensional pattern, said code comprising an information recording region for recording information, a plurality of blocks constituting said information recording region, and each block involving a recording mode designating code indicating a recording mode of the information recorded in each block, wherein said recording mode designating code of each block is disposed in front of the information recorded in said block, so that said recording mode designating code is decoded prior to said information in each block and said information is decoded according to the recording mode specified by said recording mode designating code;

performing partial decode processing for each of said plurality of blocks to decode the recorded information in each block in accordance with the recording mode specified by said recording mode designating code; and reading the information in said information recording region based on the partial decoding result of said plurality of blocks.

14. The two-dimensional code reading method in accordance with claim 13, wherein entire decode processing is performed to decode all of the information in said information recording region, and said partial decode processing is performed only when said entire decode processing has failed.

15. The two-dimensional code reading method in accordance with claim 13, wherein said partial decode processing of said plurality of blocks is performed by determining a decoding order of said plurality of blocks.

16. The two-dimensional code reading method in accordance with claim 13, wherein at least one of said plurality of blocks records error-correcting information applied to information recorded in another block, and the information in said information recording region is read by performing an error-correcting operation based on a decoding result of two related blocks.

17. The two-dimensional code reading method in accordance with claim 13, wherein said plurality of blocks include a plurality of block pairs, each block pair consisting of a data block and an error-correcting block, an error-correcting level is independently applied to each block pair, an error-correcting code is involved in each of said data blocks and said error-correcting block of said block pair to indicate the error-correcting level of said block pair, and said partial decode processing is performed by decoding the information in a designated block based on the error-correcting level specified by said error-correcting code.

18. The two-dimensional code reading method in accordance with claim 13, wherein an area code is involved in each block of said two-dimensional code for directly or indirectly indicating an existing area of each block in said two-dimensional code, and said reading method comprises the steps of:

detecting said area code from a picture image of said two-dimensional code, identifying the existing area of a designated block based on the detected area code, and performing said partial decode processing of the designated block.

19. The two-dimensional code reading method in accordance with claim 18, wherein said area code is disposed at the head of each block so that said area code is decoded prior to the information recorded in each block, and said partial decode processing is applied to a block including said area code and a succeeding data region.

20. The two-dimensional code reading method in accordance with claim 18, wherein
said recording mode designating code and said area code are represented by a cell distribution pattern, said cell distribution pattern is decodable into a bit string which is not used for recording the information in said information recording region, and
said recording mode designating code and said area code are specified by decoding said bit string.

21. The two-dimensional code reading method in accordance with claim 18, wherein
said recording mode designating code and said area code are located adjacent to each other so that said recording mode designating code and said area code are successively identified in a decoding operation.

22. The two-dimensional code reading method in accordance with claim 13, wherein
said two-dimensional code includes a format code region represented by a cell pattern to specify an existing area of each block, and
said recording method comprises the steps of:
detecting said format code region from a picture image of said two-dimensional code to obtain a format of said two-dimensional code represented by said format code region,
identifying the existing area of a designated block based on the detected format of said two-dimensional code, and
performing said partial decode processing of the designated block.

23. The two-dimensional code reading method in accordance with claim 13, wherein
a plurality of positioning symbols are provided at predetermined positions on said two-dimensional code to identify the position of said two-dimensional code, and
said recording method comprises the steps of:
detecting said plurality of positioning symbols from a picture image of said two-dimensional code,
identifying an existing area of a designated block based on the position of said plurality of positioning symbols, and
performing said partial decode processing of the designated block.

24. A method for producing a two-dimensional code including a plurality of cells arranged in a predetermined two-dimensional pattern,
said two-dimensional code comprising:
an information recording region for recording information,
a plurality of blocks constituting said information recording region, and
each block involving a recording mode designating code indicating a recording mode of the information recorded in each block,
wherein said plurality of blocks include a plurality of block pairs, each block pair consisting of a data block and an error-correcting block, and
an error-correcting level is independently applied to each block pair, and said producing method comprising the steps of:
encoding all of the information based on a predetermined error-correcting level designated as an initial value,
additionally encoding the information of a block pair based on a designated error-correcting level when the designated error-correcting level of said block pair is different from said initial value,
performing an overflow judgment to check whether the coded information is accommodated in a corresponding block,
repeating the encoding operation when said coded information overflows the corresponding block, by using another format having a wider information recording region until the encoded information fits in the corresponding block.

25. The two-dimensional code producing method in accordance with claim 24, wherein an error-correcting code is involved in each of said data blocks and said error-correcting block of said block pair to indicate the error-correcting level of said block pair.

26. A recording medium storing a software program installable in a computer system to read a two-dimensional code including a plurality of cells arranged in a predetermined two-dimensional pattern, said code comprising an information recording region for recording information, a plurality of blocks constituting said information recording region, and each block involving a recording mode designating code indicating a recording mode of the information recorded in each block,
wherein said software program comprises the processing of:
performing partial decode processing for each of said plurality of blocks to decode the recorded information in each block in accordance with the recording mode specified by said recording mode designating code; and
reading the information in said information recording region based on the partial decoding result of said plurality of blocks.

27. The recording medium in accordance with claim 26, wherein
said software program comprises the processing of:
performing entire decode processing to decode all of the information in said information recording region, and
performing said partial decode processing only when said entire decode processing has failed.

28. The recording medium in accordance with claim 26, wherein
said partial decode processing of said plurality of blocks is performed by determining a decoding order of said plurality of blocks.

29. The recording medium in accordance with claim 26, wherein
at least one of said plurality of blocks records error-correcting information applied to information recorded in another block, and
said software program comprises the processing of reading the information in said information recording region by performing an error-correcting operation based on a decoding result of two related blocks.

30. The recording medium in accordance with claim 26, wherein
said plurality of blocks include a plurality of block pairs, each block pair consisting of a data block and an error-correcting block,
an error-correcting level is independently applied to each block pair, and
an error-correcting code is involved in each of said data block and said error-correcting block of said block pair, to indicate the error-correcting level of said block pair, and said software program comprises the processing of performing said partial decode processing by decoding the information in a designated block based on the error-correcting level specified by said error-correcting code.

31. The recording medium in accordance with claim 26, wherein
said recording mode designating code of each block is disposed in front of the information recorded in said block, and
said software program comprises the processing of decoding said recording mode designating code prior to said information in each block and decoding said information according to the recording mode specified by said recording mode designating code.

32. The recording medium in accordance with claim 26, wherein
an area code is involved in each block of said two-dimensional code for directly or indirectly indicating an existing area of each block in said two-dimensional code, and
said software program comprises the processing of:
detecting said area code from a picture image of said two-dimensional code, identifying the existing area of a designated block based on the detected area code, and
performing said partial decode processing of the designated block.

33. The recording medium in accordance with claim 32, wherein
said area code is disposed at the head of each block so that said area code is decoded prior to the information recorded in each block, and said partial decode processing is applied to a block including said area code and a succeeding data region.

34. The recording medium in accordance with claim 32, wherein said recording mode designating code and said area code are represented by a cell distribution pattern, said cell distribution pattern is decodable into a bit string which is not used to record the information in said information recording region, and
said software program comprises the processing of specifying said recording mode designating code and said area code by decoding said bit string.

35. The recording medium in accordance with claim 32, wherein
said recording mode designating code and said area code are located adjacent to each other, and
said software program comprises the processing of successively identifying said recording mode designating code and said area code in a decoding operation.

36. The recording medium in accordance with claim 26, wherein said two-dimensional code includes a format code region represented by a cell pattern to specify an existing area of each block, and
said software program comprises the processing of:
detecting said format code region from a picture image of said two-dimensional code to obtain format of said two-dimensional code represented by said format code region,
identifying the existing area of a designated block based on the detected format of said two-dimensional code, and
performing said partial decode processing of the designated block.

37. The recording medium in accordance with claim 26, wherein
a plurality of positioning symbols are provided at predetermined positions on said two-dimensional code to identify the position of said two-dimensional code, and
said software program comprises the processing of:
detecting said plurality of positioning symbols from a picture image of said two-dimensional code,
identifying an existing area of a designated block based on the position of said plurality of positioning symbols,
and performing said partial decode processing of the designated block.

38. A recording medium storing a software program installable in a computer system to produce a two-dimensional code including a plurality of cells arranged in a predetermined two-dimensional pattern,
said two-dimensional code comprising:
an information recording region to record information,
a plurality of blocks constituting said information recording region, and
each block involving a recording mode designating code indicating a recording mode of the information recorded in each block,
wherein said plurality of blocks include a plurality of block pairs, each block pair consisting of a data block and an error-correcting block, and
an error-correcting level is independently applied to each block pair, and
said software program comprises the processing of:
encoding all of the information based on a predetermined error-correcting level designated as an initial value,
additionally encoding the information of a block pair based on a designated error-correcting level when the designated error-correcting level of said block pair is different from said initial value,
performing an overflow judgment to check whether the coded information is accommodated in a corresponding block,
repeating the encoding operation when said coded information overflows the corresponding block, by using another format having a wider information recording region until the encoded information fits the corresponding block.

39. The recording medium in accordance with claim 38, wherein an error-correcting code is involved in each of said data block and said error-correcting block of said block pair to indicate the error-correcting level of said block pair.

* * * * *